United States Patent [19]

Santos

[11] Patent Number: 4,908,627
[45] Date of Patent: Mar. 13, 1990

[54] MONITORING, RANGING AND LOCATING DEVICES

[76] Inventor: James P. Santos, 223 Rockingstone Ave., Larchmont, N.Y. 10538

[21] Appl. No.: 149,974

[22] Filed: Jan. 22, 1988

Related U.S. Application Data

[63] Continuation of Ser. No. 744,522, Jun. 14, 1985, abandoned.

[51] Int. Cl.$^4$ .................. G01S 13/08; G01S 13/74
[52] U.S. Cl. ........................................ 342/125; 342/42
[58] Field of Search ................... 342/42, 125, 127

[56] References Cited

U.S. PATENT DOCUMENTS

| | | | |
|---|---|---|---|
| 3,144,645 | 8/1964 | McIver et al. | 343/6.5 R X |
| 3,302,199 | 1/1967 | Kelly et al. | 343/17.7 X |
| 3,461,452 | 8/1969 | Welter | 343/12 R |
| 3,918,056 | 11/1975 | Merrick | 343/6.5 R X |
| 4,297,701 | 10/1981 | Henriques | 342/42 |
| 4,370,653 | 1/1983 | Crowley | 342/42 |
| 4,593,273 | 6/1986 | Narcisse | 343/6.5 SS |
| 4,646,092 | 2/1987 | Schreuder | 342/42 |
| 4,757,315 | 7/1988 | Lichtenberg et al. | 342/125 |

Primary Examiner—Thomas H. Tarcza
Assistant Examiner—Mark Hellner
Attorney, Agent, or Firm—Hopgood, Calimafde, Kalil, Blaustein & Judlowe

[57] ABSTRACT

Two miniaturized transceivers, each selectively responsive to predetermined radio frequency (r.f.) transmissions which may be coded, consisting of one control unit and one transponder unit. Transmission by the control unit of a modulated frequency which is received and decoded by the transponder will generate a like reply from the transponder whose round-trip delay is timed and because of the known velocity of radio waves can thus be displayed as the distance between the two units. An adjustable maximum range limit in the control unit will generate an audible, visual or other alerting signal in the control unit when the distance between the two units is exceeded. Such signal is also obtained when the signal from the transponder is interrupted. Low-power consumption can be effected for battery operation by arranging short periodic bursts of r.f. energy between the two transceivers, there being logical means to time-align the respective transmit and receive modes of the two units. The transponder transceiver can be considered as behaving like an "active" reflector of the predetermined r.f. signals from the control unit.

14 Claims, 4 Drawing Sheets

TRANSPONDER BLOCK DIAGRAM

MONITORING, RANGING AND LOCATING DEVICES

This application is a continuation of application Ser. No. 744,522, June 14, 1985.

BACKGROUND OF THE INVENTION

There are numerous radio-frequency anti-theft and signaling security devices that generate an alarm when an object or person exceeds a prescribed distance, fixed or adjustable, between a transmitter and receiver.

In some cases, a coded signal is transmitted in order to differentiate between otherwise identical units located in a particular area.

All of these existing systems consists of a signal transmitter and receiver transmitting a signal with or without an identifying code. The transmitter sends out an r.f. signal which is received by the receiver. The receiver amplifies the incoming signal and triggers an alarm when the level of the signal falls below a prescribed value. If it is desired to set a range beyond which an alarm will be generated, an adjustable dial presets the sensitivity level of the alarm trigger. One fundamental problem, however, is common to all these systems. They depend wholly on r.f. signal strength for their ranging capabilities.

The use of signal strength as a range measurement can be seriously compromised by many factors. For example, placement of the transmitter and receiving antennas relative to each other can severely attenuate signal strength depending on the r.f. environment local to each thereby rendering an inaccurately triggered alarm. The mere bodily rotation of a person whose transmitter is at one point, even in a line of sight, to the receiver will result in a drastic change in signal strength if that person's body is rotated 180 degrees causing the body to lie between the antennas. In addition, hills or dips in the terrain, r.f. reflectors such as buildings, autos, trees, and wet or dry conditions will all severly affect the received signal strength.

R.f. levels at a given range can vary up to 30 dB or more, depending on the above mentioned circumstances which is equivalent to a change in a range reading of up to 500% or more.

Tests have indicated that changes in range measurements from 2 to 1 to 10 to 1 can be obtained depending on the r.f. frequency used for the transmissions which determines whether field strength varies as 1/R or 1/R squared (where R=Range) and how perfectly omnidirectional the antenna design is, as well as the above factors.

There are other methods that have been devised for ranging an object and have been in use for a considerable length of time. One method involves the transmission of a high powered r.f. pulse which is reflected off the object to be ranged and received by the receiver where the time delay is translated into distance. This principle works well provided there is a sufficient power source but has the disadvantage that the passive reflector causes attenuation of the transmitted signal power by 1/R to the fourth power. The method therefore requires a very high power level coupled to a very sensitive receiver.

Another method used for ranging purposes is by use of a laser beam. In this case, a short high powered light pulse is directed towards the target which then reflects the pulse back to the source where the time delay is measured and translated into distance. Somewhat more efficient, the power attenuation of the returned signal is 1/R squared power. The disadvantage however, is that one needs to seek and locate the object or individual so that it may be targeted.

The present invention incorporates an omnidirectional antenna with no preferred transmission direction required, since the control unit and corresponding transponder identify each other by other means (e.g. digital coding, r.f. frequency band pair, modulating frequencies, etc.)

OBJECTS OF THE INVENTION

It is therefore an object of the present invention to provide a new and novel ranging and locating system that obviates the problems and drawbacks associated with conventional devices for these purposes.

Another object of the present invention is to determine the range between the units without using the amplitude of the received radio frequency field strength.

Still another object of the present invention is to provide range information, which may be quasi-continuous or of intermittent update depending on the mark-to-space ratio of the r.f. transmissions.

Still another object of the present invention is to provide a miniaturized portable device offering failsafe reliability of transmission coupled with minimal power consumption.

Yet another object of the present invention is to provide means for directional location of the individual or object being monitored, and to provide a user settable range limit with an alerting indication.

Still another object of the present invention is to provide means for voice or non-voice communication either way between the two units when necessary.

Still another object of the invention is that the transponder unit continues to "free-run" and to transmit its periodic r.f. pulse when the range of the control unit has been exceeded, so that it can act as a beacon, so that it can be searched in case of loss.

The aforementioned and further objects of the present invention will become more apparent by referring to the following detailed description and drawings.

SUMMARY OF THE INVENTION

The present invention consists of a monitoring and alarm system intended for monitoring objects or individuals who may lack judgmental skills.

To ensure transmission reliability, a system using two transmitters and two receivers is described.

The control unit, a transceiver, also contains a stable reference oscillator whose frequency subdivisions are used both to modulate and to transmit a periodic r.f. pulse that may also be digitally coded. The receiver at this time is switched off or is in a "standby" mode. The transponder unit, also a transceiver, has similar circuitry as the control unit except that it is initially in a receive only mode. Its receiver will operate on the same r.f. channel as is transmitted by its associated control unit. When it receives the r.f. pulse from the control unit the transponder will:

a. demodulate the coding signal and check that it has received a pulse from its associated control unit.

b. Lock up a stable phase-lock loop oscillator (PLL) to be at the required frequency subdivision of and in a specific phase relationship to the reference oscillator in the control unit.

c. Switch off its receiver and transmit a modulated and suitably coded r.f. signal back to the control unit on a different r.f. channel.

The modulation is derived from a suitable frequency subdivision of the PLL oscillator. In the meantime, the control unit has switched off its transmitter and entered a receive mode. When it receives the transponder signal it demodulates, decodes and after verification that it is the associated transponder signal, applies the modulating component to a phase detector. The other input to the phase detector is derived from the control unit's stable reference oscillator. The round trip time delay from control unit to transponder will appear as a phase change to the detector. The output therefore can be used as range information. The signal can be calibrated and applied to a digital or analog display device indicating distance. Clearly, a change in distance between the units enables the control unit operator to determine the direction of the transponder, which together with the distance information thereby determines its location. This r.f. exchange between the two transceivers with their attendant tasks can be considered as a "handshake" in the sense that unless the round-trip is completed successfully, alarms can alert the user warning that some emergency situation or fault has arisen, which demands further investigation. Furthermore, because two-way communication has established range information, coded alert or call signals or other information can be received and displayed equally by either control unit or transponder, there being only differences in the detail of the circuit arrangements. Rather than using the monitored object as a "passive" reflector as in other ranging systems, the present invention utilizes the monitored object as an "active" reflector.

The r.f. pulse can have short duration with relatively long "off" periods which together with the concept of the "active" reflector, requires minimal power for effective communication over desired distances. This feature can extend battery life and reduce battery size as an aid to miniaturization and portability.

The control unit has a "set-zero" control that can be used to "zero" the distance indicator(s) when the two units are in close proximity. Zeroing may also be accomplished automatically when the units are turned on.

If, for any reason, the control unit does not receive the r.f. pulse from the transponder unit, the control unit initiates an alarm alerting the control operator. There may be several reasons for the lack of reception, for example a faulty or low battery at the transponder, low received r.f. power due to range or environment, or immersion of the complete transponder in water, or other reasons. Specific arrangements are made so that immersion in water or other conducting fluid will trigger a "panic" alarm. Furthermore, terminals can be placed on the outside of the transponder sensitive to moisture such that a conductive path triggers the alarm, thus making the immersion feature fail-safe.

When an individual is carrying the transponder and is in some precarious or threatening situation, a "panic" button (or two buttons interlocked to prevent accidental operation) housed in the transponder may be pressed causing a temporary suspension in transmission to the control unit thereby tripping an alarm.

The above mentioned alarms, except for the suspension of the control unit r.f. reception, may also be implemented by coding the transponders signal, or by suspending the modulating frequency transmission, thereby temporarily inactivating the ranging information facility.

Yet another feature of the preferred embodiment is to alert the control unit operator if the transponder unit is forcibly removed by uncoupling a connector strap or opening a clip. This can also be arranged to suspend r.f. transmission or transmit a coded signal causing an alarm to be generated in the control unit.

In the event the control unit operator wishes to "call" the person carrying the transponder, provision is made such that suspension or coding of the transmission from the control unit causes an appropriate alert which may be audible or visible to be generated in the transponder. This "call" operation may also be generated automatically by the transponder when the transponder exceeds the prescribed distance. In this fashion, both parties will be alerted to the excessive distance between them.

In the event that the prescribed distance between the two units is exceeded, the control unit will normally continue to receive the transmissions from the transponder, with attendant ranging, until a maximum distance is reached, at which point inadequate signal strength prevents reliable range information from being derived by the control unit's receiver. Up to this point however, the operator of the control unit can initiate the procedure to locate the transponder by moving in a prescribed manner and determining whether the distance between the units is increasing or decreasing. Obviously a decreasing range indication means that the control unit operator is moving towards the transponder unit. This movement can be continued until the transponder is located.

DESCRIPTION OF THE PREFERRED EMBODIMENTS

The means for deriving range information by not using received signal strength has two basic embodiments:

a. Range derived using the phase delay of a known stable reference frequency used to modulate the radio frequency signal using the round-trip or b. using the round-trip delay of a short r.f. pulse.

Figure 1:
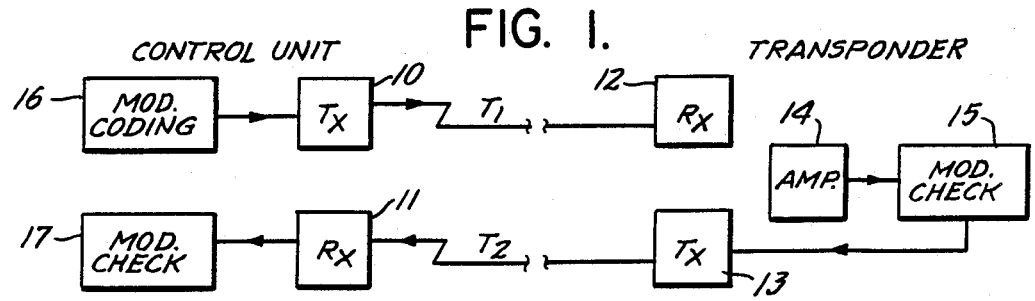
FIG. 1 is a simplified block diagram of the two transceiver arrangement.

Referring to FIG. 1, assuming that time-alignment of the control unit and transponder is achieved (described in detail later) the receiver of transponder 12 is initially in the receive-only mode waiting for the r.f. signal from control unit transmitter 10 which has been suitably coded by the modulation coder element 16. When the transponder receiver 12 receives the transmitted signal, it demodulates the signal, logically checks the frequency and/or code in 15, locks the phase-locked loop oscillator to be in a frequency and phase relationship with the control oscillator in the case of embodiment (a). The transponder then switches off its receiver 12 and transmits an r.f. signal back to the control unit, suitably coded, from its transmitter 13 and on a different frequency after amplifying the signal through amplifier 14.

Meanwhile the control unit transmitter 10 has switched off and entered a receive mode in its receiver 11. When it receives the transmitted pulse from the transponder, it demodulates, checks the code in element 17, and applies the modulating component to a phase detector to compare the phase of the returning signal against its reference oscillator. The phase-shift of the demodulated signal corresponds to the round-trip time-delay between the control unit and the transponder and can be used to operate a suitably calibrated meter to indicate the distance or range between the two units.

Figure 2:
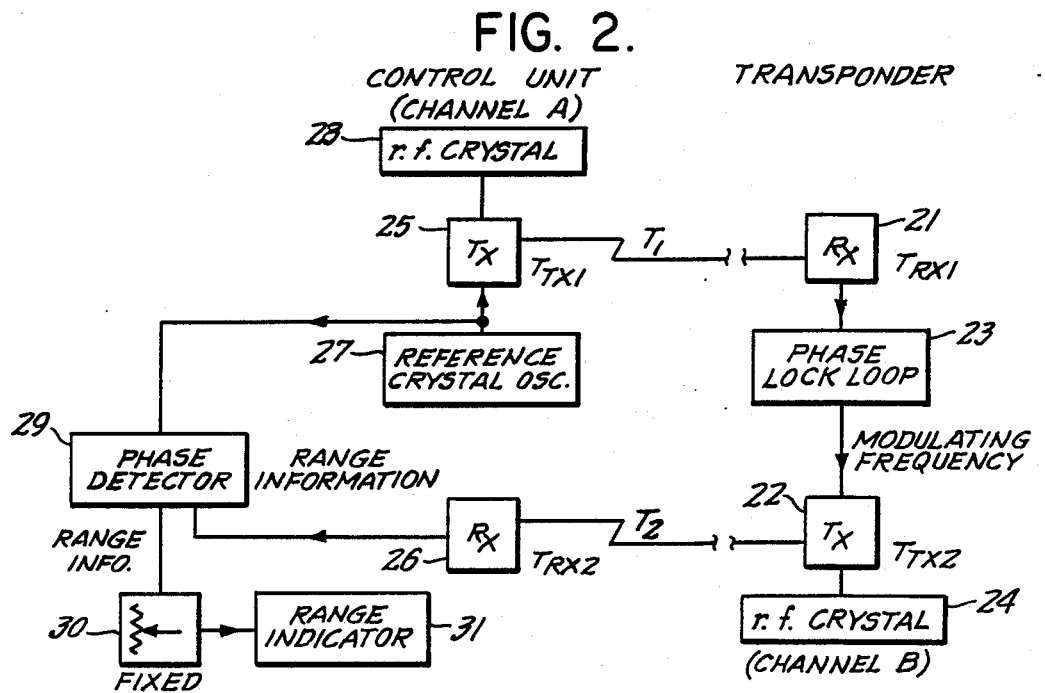
FIG. 2 is a simplified block diagram of the first preferred embodiment (a) of the present invention.

Referring to FIG. 2 and embodiment (a) timing delay description, control-unit transmitter 25 transmits an r.f. pulse at a frequency (channel A) determined by crystal 28 while the reference crystal oscillator 27 supplies the r.f. modulating signal. T-tx1 represents the fixed group-delay for the reference modulating signal through the r.f. transmitter and its associated antenna. T1 represents the group-delay between the control unit antenna to the transponder receiver 21. When the transponder receiver 21 has received and demodulated the r.f. signal from the control unit transmitter 25, it locks up its phase lock loop oscillator 23 to be at the same frequency and in a specific phase relationship with the demodulated signal originally derived from the reference crystal oscillator 27. T-rx1 represents the fixed group-delay of the modulating signal through the receiver and PLL components of the transponder. The transponder then switches off its receiver 21 and transmits a suitable r.f. signal derived from the crystal 24 (channel B), back toward the control unit from its transmitter 22. The fixed group-delay for this operation is T-tx2. The group-delay for the return r.f. path from the transponder transmitter 22 to the control-unit receiver 26 is represented by T2.

The control unit, in the meantime, has switched on its receiver and demodulates and decodes the r.f. pulse on channel B from transponder transmitter 22. It applies the de-modulated signal to a phase detector 29 and compares the phase of the received signal against its reference crystal oscillator signal, 27. The group-delay for the control unit receiver is designed T-rx2. The change in phase produces an output which corresponds to the roundtrip group-delay from control unit to transponder, including the fixed group-delays. This output is used to derive and indicate range information. The total fixed group-delay is equal to the sum of all the separate fixed group delays, i.e.:

Total fixed delay $= T\text{-}tx1 + T\text{-}tx2 + T\text{-}rx1 + T\text{-}rx2$

The total variable group-delay which is proportional to the distance between the control-unit and transponder is equal to the sum of the variable delays, i.e.:

Total variable delays $= T1 + T2$

However, the fixed total group delay can be compensated for by adjusting the zero output of the phase detector when the two units are operated in juxtaposition (i.e. when the range is zero). This is accomplished by the fixed delay compensation component 30 that is manually or automatically adjusted to zero, making $T1 + T2 = 0$.

Several different means are available to engineer the phase detector but a digital phase detector offers the advantage that there is a linear relationship between its output signal and relative input phase and therefore with distance. The phase-lock-loop is a good means to recover the modulating signal from the transponder receiver because it is able to operate to zero dB signal to noise ratio, and maintain a very stable phase relationship between its oscillator and that of the modulating signal.

Figure 3:
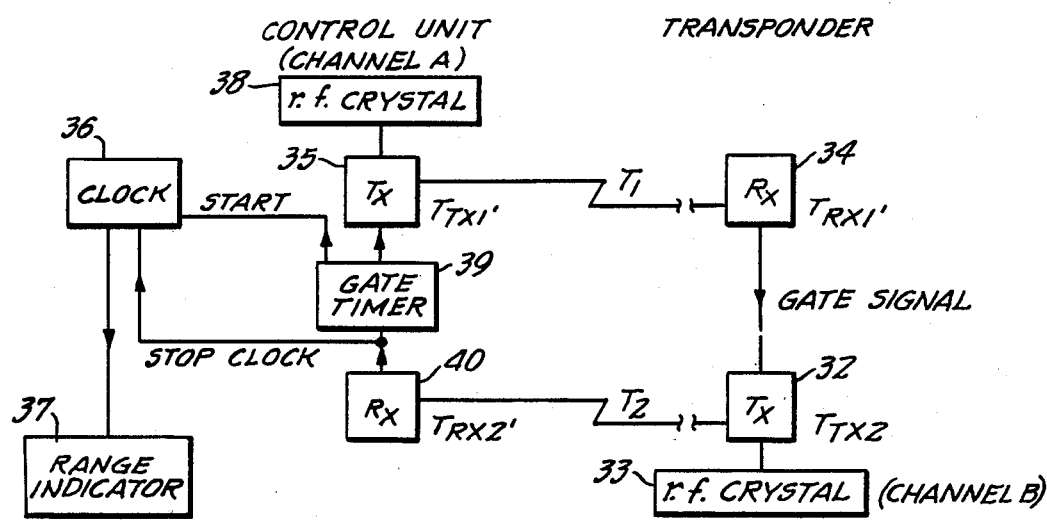
FIG. 3 is a simplified block diagram of the second preferred embodiment (b) of the present invention.

Referring to FIG. 3 and embodiment (b) time delay description, control transmitter 35 transmits a short r.f. pulse whose frequency (channel A) is determined by crystal 38 while gate timer 39 starts its clock. As in embodiment (a) time delay, T-tx1' represents a fixed pulse and the corresponding point on the gate timer 39 waveform. T1 represents the group-delay between the control unit transmitted pulse from transmitter 35 and the transponder receiver 34. T-rx1' represents the group-time delay between receipt of the pulse by the transponder receiver 34 and the generation of the gate signal for the transmission of an r.f. pulse from transponder transmitter 32. This transmission is on channel B, determined by crystal oscillator 33. T2 represents the time delay between the transmitted pulse from transponder transmitter 32 and received signal by control receiver 40. The fixed delay through the receiver 40, to trigger the gate timer 39 is represented by T-rx2'. The output signal from gate timer 39 is counted by an accurate reference clock 36 that has been stopped after the signal is received by control receiver 40. The total delay time represents the round trip time between control unit and transponder including fixed delays, and is used to drive a range indicator, 37. The clock is then reset ready for the next pulse from the gate timer 39. Similar to before, the total fixed delays are given by:

Total fixed delays $= T\text{-}tx1' + T\text{-}rx1' + T\text{-}tx2' + T\text{-}rx2'$ The total variable delay caused by the distance between units is given by:

Total variable delay $= T1 + T2$

The fixed delays can be compensated for so that the indicator 37, only displays the actual calibrated range. This embodiment, employing brief r.f. pulses, is more sensitive to noise than embodiment (a) because the r.f. pulse leading or trailing edge rise and fall times, respectively, together with noise, provide an uncertainty in accurately determining the "on" and "off" times. This uncertainty adds to the range indicator's reading. Normal noise-reducing techniques can be applied to the process, but embodiment (a) will continue to operate satisfactorily at inherently lower signal to noise levels.

It should be noted that, so far, no mention has been made of the method of modulation. Any method may be employed, for example, frequency modulation, phase modulation, amplitude modulation, SSB, quadrature modulation with or without suppressed carrier. All methods are suitable and the preferred method will be chosen depending on optimizing the required parameters, e.g. maximum range, minimum power, etc. To allow for operation of many pairs of units, the r.f. channels should clearly be in matched pairs for the control unit and transducer.

Figure 4:
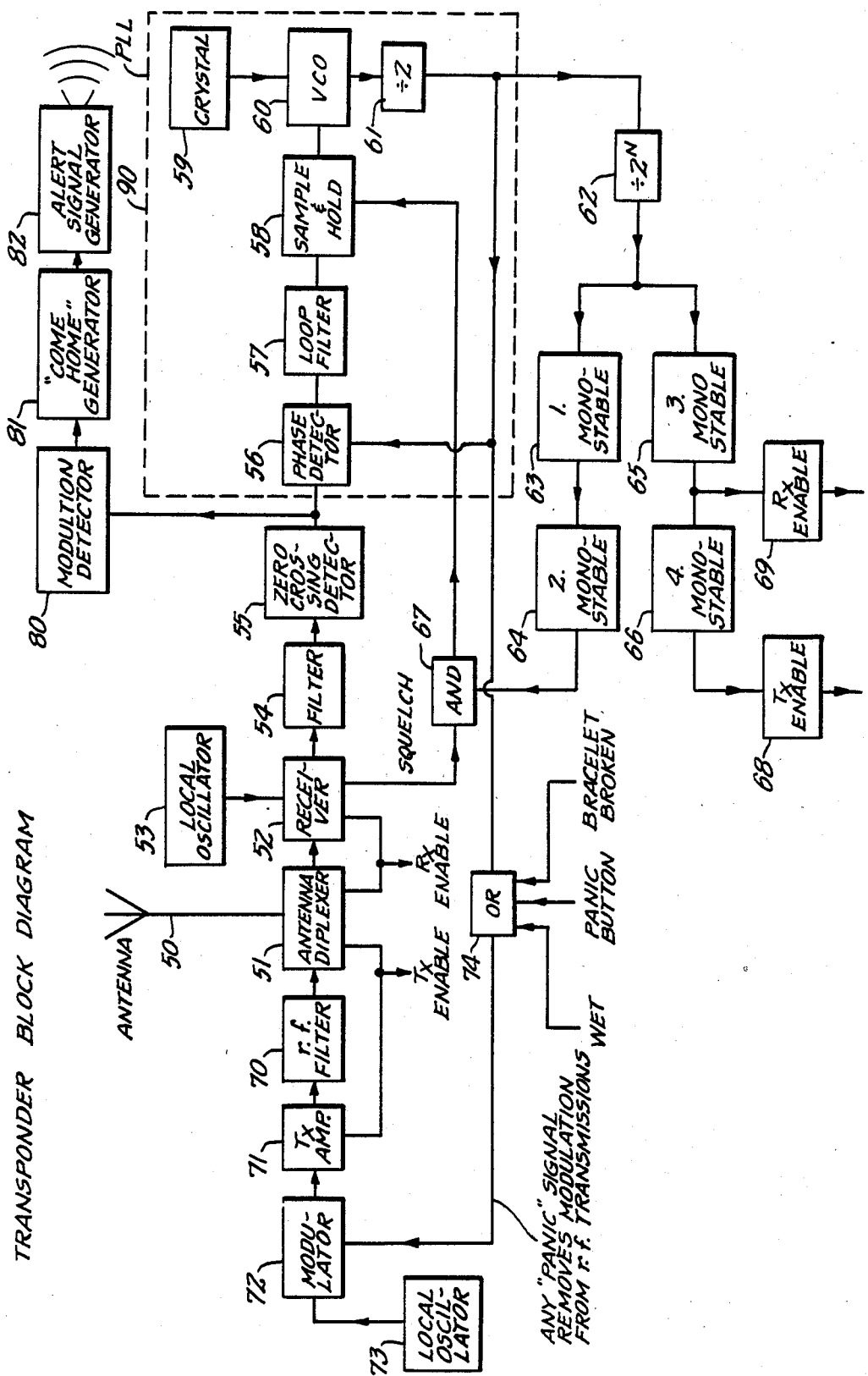
FIG. 4 is a more detailed block diagram of a transponder unit of embodiment (a).

Referring now to FIG. 4, shown is a more detailed block diagram of the transponder unit of embodiment (a) which employs the phase-lock-loop method of determining range. This block diagram shows the components required for a typical version of embodiment (a) and is by no means meant to indicate that it is the only way, there being many different ways to achieve the same result.

There is an antenna 50, which will be basically a quarter wave dipole or other equivalent omni-directional antenna. It serves as the transmit and receive antenna. Recall that these functions are time-division multiplexed. An antenna diplexer 51, steers the antenna to the transmitter or receiver according to the function of the Tx enable, or Rx enable, waveforms derived from 68 and 69 respectively.

Following first is the receive functions which are also the initial operating mode of the transponder.

Local oscillator 53, which may be crystal controlled, operates on, say, channel A, and a mixer in the receiver converts the r.f. frequency to a suitable i.f. frequency which is amplified and demodulated by receiver 52. The demodulated signal passes through an optional bandpass filter, 54, which rejects even order (2nd, 4th, etc.) distortion components which may emerge from the receiver and could interfere with accurate operation of the following signal zero-crossing detector 55. Only the fundamental frequency of the modulating signal is required for accurate phase information. The function of the zero crossing detector 55 is to establish a full level square wave at its output whose phase is the same as that of the sine wave at its input. This circuit element is only required when a digital phase detector is used (e.g. an exclusive OR gate). The squared signal then passes to the PLL phase detector, 56, whose functions will be described later.

The output of phase detector 56 is fed to the loop low pass filter and amplifier 57, which may be of any suitable order to obtain fast acquisition of the signal with a suitable phase margin for stability. Anyone having knowledge of state of the art for phase lock loop designs will be cognizant of suitable filter and amplifier configurations. The output of the loop filter amplifier is sampled and held by the sample and hold element 58, and in turn feeds the control port of the voltage controlled oscillator (VCO) 60 which for high accuracy may incorporate a crystal, 59. The function of the sample and hold element 58, is to insure that the phase lock loop is only operative while a valid received and demodulated signal is obtained. When the demodulated signal appears, the loop is closed and the phase lock loop acquires frequency and phase lock. Just before the signal is switched off, the control voltage is "held" until the next r.f. pulse supplies a signal again at which time the cycle is repeated.

Since VCO 60 control voltage is held constant in the intervening period, the VCO continues to oscillate at the correct frequency and maintains the same phase relationship to the reference oscillator until the next sample and hold function is initiated. Such techniques are common in the art and are employed, for example, in color television receivers to recover the color signal subcarrier from the color burst which is transmitted for short periods at a predetermined regular rate. If a digital phase detector is used, in accordance with current practice, the VCO runs at exactly twice (or an integer multiple of) the frequency of the modulation signal. Divide by two element, 61, provides the VCO reference signal to the second part of phase detector, 56, thus closing the loop of the PLL circuit which is indicated by dotted line 90, and also provides the modulating signal to the transmitter modulator, 72, via a multiple OR gate 74, whose function will be described below.

Returning now to the output of the divide by two element, 61, yet another output feeds the binary divider component, 62. The purpose of 62 is to provide a low frequency output signal so that accurately periodic receive and transmit pulses are obtained. These being an identical divide ratio of 2 to the N power, where N is an integer, in the control unit so that transponder and control units may transmit and receive exactly at the same rate. VCO 60 is operating in lock at the identical frequency as the control unit reference oscillator. N may be any suitable integer depending on the desired transmit periodic rate. The low frequency output of the binary divider, 62, is used to trigger two monostables 63 and 65. Dealing first with monostable 65, the width of the output pulse determines the receiver "on" time (and corresponds with the control units transmit "on" time). It therefore feeds the receive enable element, 69, whose function is to turn the receiver, 52, "on", and diplex the antenna, 51, towards the receiver. On the back edge of this receive pulse, the above two elements are turned "off". The back-edge is also used to trigger monostable, 66, which turns the transmitter "on" via Tx enable, 68, and via diplexer 51, switches the antenna 50, toward the transmitter. The duration of the transmit pulse is determined by the width of the pulse delivered by monostable, 66.

The transmitter has a local oscillator, 73, which may be crystal controlled and is at a suitable frequency, say, channel B. The local oscillator feeds the modulator, 72 which provides any suitable modulation as formerly described. The modulator then applies its output to the transmitter output amplifier, 71 and via a suitable r.f. filter and antenna matching element, 70, feeds the antenna, 50, via the diplexer 51.

The modulating signal is derived from the PLL VCO 60 via the divide by two element 61, and the multiple OR gate 74, as previously described. The purpose of the OR gate 74, is to remove the modulating signal from the modulator 72, whenever a "panic" alert is required. There is similar modulating signal detection in the control unit which recognizes this absence of modulating signal so that a necessary alerting signal is derived.

In the transponder, either pressing safety interlocked panic buttons or a broken bracket or bracelet link or the transponder being immersed in moisture or water, will operate multiple OR element 74, thus removing the modulating signal.

Similar to the control unit, the transponder has a modulation detector 80, which is fed from the modulation zero-crossing detector element 55. If the modulation is removed from the control unit transmitter, for example, when the operator wishes to send an alerting signal to the operator of the transponder unit, a button may be pushed to remove modulation. The transponder detector, 80, operates a "come home" generator, 81, and produces a suitable alert signal via 82, which may be audible, visual or other simple alerting means.

Finally the purpose of monostables 63 and 64 will be described. For the PLL 90, to lock up satisfactorily, it is essential that a valid signal is being received by the receiver, 52, and that the receiver is on. The sample and hold element 58, is only operated during the receiver's "on" period and so monostable, 63, is triggered simultaneously with receiver on monostable 65. Its purpose is to provide a short delay period before the sample and hold element is operated to allow for the finite start-up time of the receiver. After this start-up time, the data will be valid, the receiver squelch has operated an monostable 64 is triggered and this element generates the sample pulse width and closes the loop in the PLL via an AND gate 67. The other input to the AND gate, 67, is the receiver squelch output, so that if, for any reason, the receiver does not receive a valid signal, the sample and hold element, 58, is not turned on. The width of the "on" pulse derived from the monostable, 64, is arranged to bracket the valid data from the receiver, and turn off the sample and hold element just before the end of the receiver's "on" pulse derived from monostable 65. By this means, it is arranged that the PLL only operates with valid data to ensure that an accurate phase lock is achieved with the modulating signal.

Figure 5:
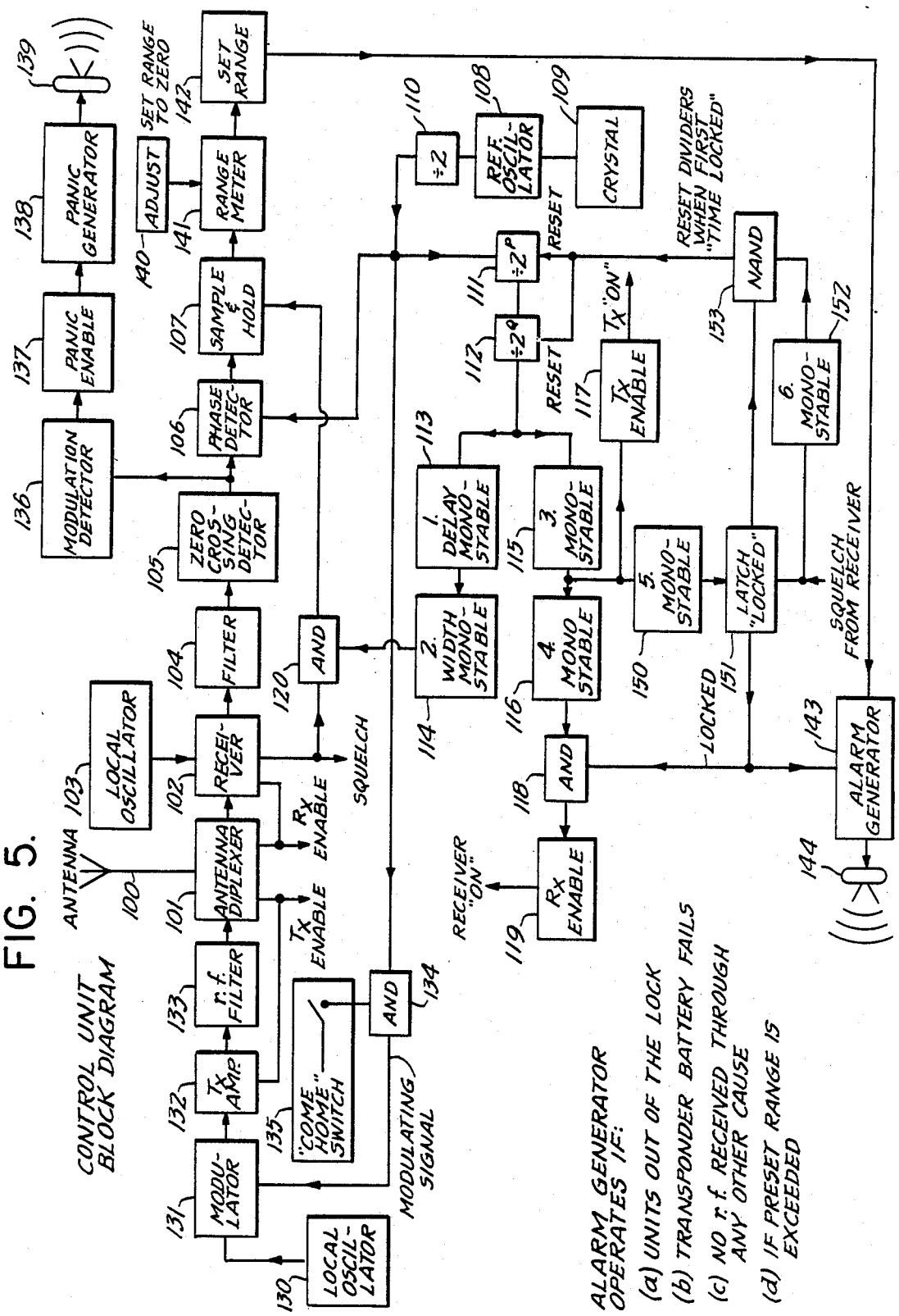
FIG. 5 is a more detailed block diagram of a control unit of embodiment (a).

Many circuit elements in the control unit block diagram, FIG. 5, are essentially similar to the equivalent elements in the transponder, FIG. 4, and these will only be described briefly first.

The omnidirectional antenna, 100, is fed from the transmitter or to the receiver via diplexer element 101. Local oscillator, 103, feeds the mixer in the receiver 102 which demodulates the r.f. signal (channel B), and applies its output to band pass filter 104 and zero crossing detector, 105. The output signal feeds the modulation detector 136, and the phase detector, 106. The other input port of the phase detector is fed from the stable crystal reference oscillators, 109 and 108, via the divide by 2 element, 110, as in the transponder. In this case, the phase detector does not feed a PLL but is used to determine the phase-shift, or group-delay of the round-trip signal. A sample and hold element, 107, is operated during the receiver-on mode of the control unit, and is fed from the delay 113 and width 114 monostables. The output of monostable 114 is AND gated with the receiver squelch signal in element 120, so that samples are taken only when the received data is valid. The sample and hold output signal is used to operate a suitable calibrated range meter, 141, with a set zero range element control 140 as formerly described. The set range element 142 can be preset so that, should the distance between the control and transponder units exceed the set value, alarm generator, 143, is activated thus warning the operator of the problem.

The output from the divide by two element 110 also feeds the transmitter modulator 131 via AND gate 134. Operation of the "come home" switch 135 also feeds the AND gate 134, and removes the modulation signal from the modulator 131. As previously described, this will alert the transponder unit operator to "come home" or contact "home". The divide by two element also feeds the periodic-rate dividers 111 and 112. Counter 111 divides by 2 to the P power and counter 112 by 2 to the Q power where 2 to the P power +2 to the Q power =2 to the N power, P and Q being integers. Thus the total count is the same as the divide by 2 to the N power counter in the transponder. The reason for breaking the divide by 2 to the N power into two counters will become clear when the time alignment of the two units is described.

Divider element, 112, now at the low frequency periodic rate, feeds the transmit enable monostable 115, and the sample and hold delay monostable 113. The transmit pulse "on" time is given by the width of the monostable pulse which feeds Tx enable element 117 and switches the transmitter on and the antenna diplexer, 101 towards the transmitter. The back edge of this pulse triggers the monostable, 116, which via AND gate 118 switches the receiver on via receive enable, 119, and the antenna diplexer 101, toward the receiver. The purpose of the AND gate, 118, is such that the receiver stays "on" after the back-edge of the monostable 116 would normally switch off the receiver if the transponder and control unit are not in time alignment.

The means for the periodic-rate time alignment of the two units will now be described and will be further clarified by the description of the timing diagram FIG. 6. The time alignment process relies on the simultaneous receipt of the squelch signal produced by the receiver with the receiver "on" monostable, 116, and operates as follows:

At the back edge of the transmit pulse from monostable 115, the receiver monostable 116, is turned on and a short duration monostable 150 is fired. The trailing edge of this monostable triggers a D type latch, 151, which can take up one or the other of two conditions.

In condition one, if the receiver squelch is present at the time of the trailing edge of monostable 150, then the units are in time alignment (and are "locked"), and no further action is required. The normal periodic cycle of transmit and receive for the two units is obtained, the control units receiver flips on and off normally according to monostable 116's output, the AND gate 118 being transparent.

In condition two, the units are not time aligned or "locked", then monostable 150, flips latch 151 which operates the receive enable 119, via AND gate 118 holding the receiver on after receiver monostable 116 normally switches the receiver off. The receiver is now in a wait on mode. At some arbitrary time later, the associated transponder transmits its r.f. pulse. The control units receiver, being on, receives the pulse and generates a squelch signal. The back edge of the squelch signal then flips the latch 151 to the "locked" condition and triggers a very short pulse from monostable 152. This pulse passes through the NAND gate, 153, and resets the counters 111, 112 to a preset number. Normally the reset pulse would set the counter to zero, and time alignment would then be achieved, but since this reset operation occurs at the end of the transmit and receive cycle, for the first count only, a short count must be made. The count is shorter than the periodic rate by a time exactly equal to the duration of the transmit/receive cycle. It is now clear that the reason for dividing the 2N power counter into two is that during the reset cycle, divide by 2Q power is equal to the time of the transmit/receive "on" cycle. Thus counter divide by 2 to the P power is reset to zero, and counter divide by 2 to the Q power is reset to one. By this means, a short count is accomplished, and without the reset pulse on the next periodic count, a normal divide by 2 to the N power count is made which is identical to the corresponding count in the transponder. Thus time alignment is perfect and the latch, 151, remains in the condition 1, "locked" mode.

If for any reason, at a later time, the two units become unlocked and out of time alignment, then the condition 2 cycle of operations is performed with the receiver remaining "on" until a locked condition is once again achieved.

The latch is also used to give an alerting signal via alarm generator 143, and alerting output 144, when it is in the "unlocked" condition. Clearly failure to receive the r.f. pulse from the transponder enables this condition and alerts the operator that something is wrong with r.f. link, or there is some problem with the transponder operator or unit.

The transmit components are the same as the transponder but operate on channel "A". Local oscillator 130, feeds modulator 131, transmitter amplifier 132, and r.f. filter 133 to the antenna 100 via the diplexer 101.

Finally removal of the modulation at the transponder, i.e. a "panic" signal is detected by element 136, whose output operates panic enable 137, and an alarm generator 138, indicating a panic alert via element 139, which may be audible, visual or other means.

Figure 6:
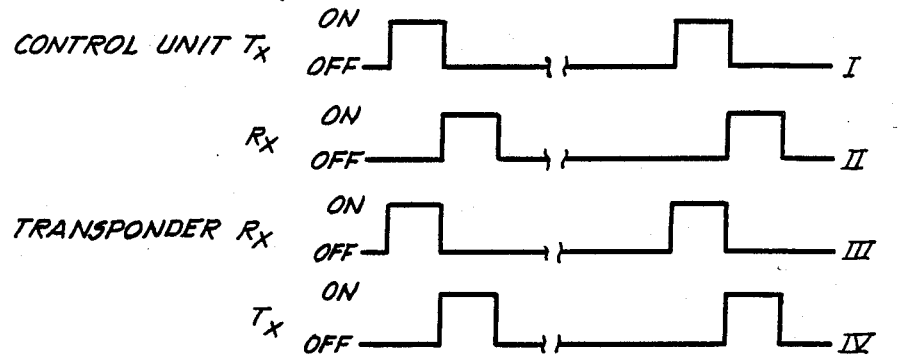
FIG. 6 shows a diagram indicating the function of the "Time Aligning" Logic incorporated in the diagram of FIG. 5.
Figure 6:
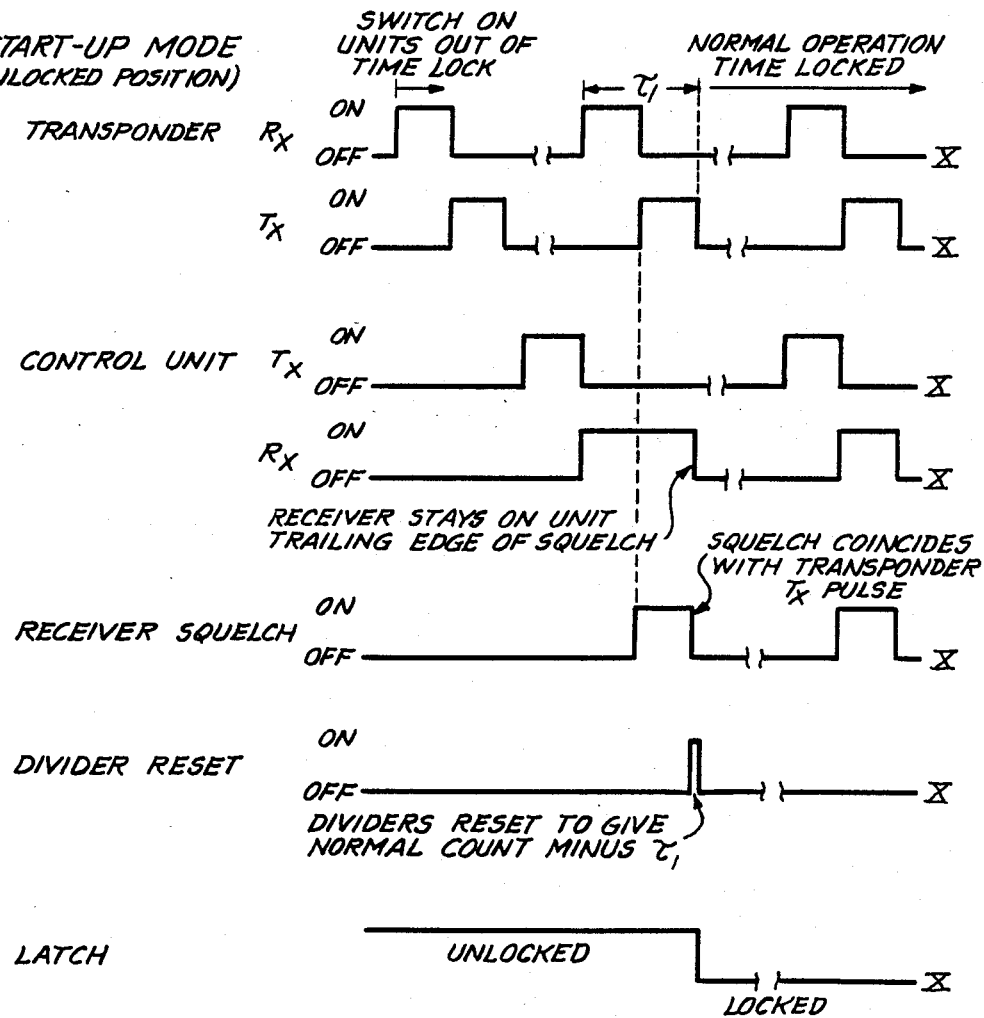

FIG. 6 represents the waveform timing sequences for the control unit and transponder, both in their normal (locked), time alignments (A) and when the cycle goes from the unlocked to the locked timing sequences (B).

A. When the control unit and its associated transponder are in normal operation in time lock, the waveform sequence is as follows:

1. The control unit transmitter, Tx, switches on and its r.f. signal as in line I.
2. Simultaneously, the transponder receiver, Rx, is switched on and is in a receive mode as in line III.
3. The transponder receiver receives the transmitted signal from the control unit, then switches off its receiver while simultaneously switching on its transmitter as in lines III and IV.
4. The control unit transmitter, in the meantime, has switched off its transmitter, and has switched "on" its receiver, to receive the transponder's transmission as in lines I and II.
5. The transponder transmits its r.f. signal to the control unit and switches off its transmitter as in line IV.
6. The control unit receiver, after receiving the transponder's r.f. signal simultaneously switches itself "off" as in line II.
7. Both control unit and transponder crystal reference and PLL oscillators with associate divide by 2 to the N power counters ensure that the desired time interval between r.f. pulses is continuously maintained for all repeated periodic cycles.
8. The above sequence continues until the units are switched off.

Turning now to diagram 6(B), in which the time-alignment sequence of waveforms is shown, starting with an "unlocked" condition.

B. In the initial time alignment of the control unit and its associated transponder, the sequence is as follows:

1. The transponder takes up its periodic Tx and Rx cycles in the normal way as in X and XI.
2. After a receive cycle the transponder receiver shuts itself "off" while simultaneously switching "on" its transmitter as in X and XI.
3. The transponder transmitter transmits its r.f. signal to the control unit as in XI.
4. Meanwhile, the control unit turns on its transmitter at an arbitrary point relative to the transponder's time cycle as in XII.
5. The control unit transmitter transmits its r.f. signal to the transponder which is ignored by the transponder as in XII and XIII.
6. The control unit switches "off" its transmitter while simultaneously switching "on" its receiver as in XII and XIII.
7. At this time, control unit and transponder transmissions and subsequent receiver time cycles are independent of each other as in X, XI, XII, and XIII.
8. The control unit receiver, however, after the initial transmission from its transmitter remains in an "on" condition waiting for reception of the transponder's transmission as in XIII.
9. The "remain on" sequence is caused by the latch being in an "unlocked" condition as in XVI.
10. As soon as the transponder transmission is received, the control units squelch waveform is present as in XIV.
11. When the transponder transmission ends, the back edge of the control unit's squelch waveform triggers divide by 2N power counter set and reset pulse as in XV.
12. On the back edge of the set/reset pulse the latch is set to the "locked" condition as in XVI.
13. The control unit dividers perform a short count by divide by 2 to the P power, once as in XV.
14. Thereafter the units are time-aligned, and a normal full count of divide by 2N power is achieved which is equal to divide by 2P power +divide by 2Q power as in X, XI, XII, and XIII.
15. If the units come out of time alignment again for any reason, the sequence of operations itemized in points 1 to 14 is carried out again until a satisfactory locked condition is achieved. There are many ways the details of the units indicated in FIGS. 4 and 5 can be achieved, and anyone having knowledge of the state of the art will understand the basic procedures for making the control and transponder units in many different embodiments for indicating range, free of reliance on the received r.f. field strength.

Various changes in form and detail may be made without departing from the spirit and scope of the present invention. Consequently, it is intended that the appended claims be interpreted as including all such changes and modifications.

What is claimed is:

1. Ranging apparatus comprising first and second transceiver units, each said transceiver unit containing an RF transmitter, RF receiver and control circuitry, said control circuitry including means for determining the distance between said first and second units independent of the received RF field strength of the transmitter of the other unit, said control circuitry of said first unit including means for causing its associated transmitter to transmit an RF pulse, upon receipt of said RF pulse by the receiver of said second unit, the control circuitry of said second unit causing its associated transmitter to transmit a reply RF pulse, said control circuitry of said first unit including means for measuring the time interval between said transmitted pulse and said received replay RF pulse, display means connected to said control circuitry for indicating the determined distance between the units, means for triggering an alarm signal when the determined distance exceeds a predetermined amount said control circuitry of said second unit further including means for interrupting RF transmission from its associated transmitter upon receipt of a predetermined triggering signal, said control circuitry of said first unit including means for detecting the absence of said RF signal from said transmitter of said second unit and generating an alarm signal therefrom.

2. The apparatus as claimed in claim 1, wherein said control circuitry further includes means for compensating for the fixed time delays associated with the transmitter and receiver of each said transceiver unit.

3. The apparatus as claimed in claim 1, wherein said control circuitry of said first and second units causes said transmitter of said second unit to continue to transmit said signal, said receiver of said first unit receiving said signal, said first unit continuing to determine the distance between said first and said second transceiver units after said determined distance exceeds a predetermined amount.

4. The apparatus as claimed in claim 1, wherein said control circuit includes means for pulsing the transmitter and receiver of each unit in time coordination with each other to thereby conserve power.

5. The apparatus as claimed in claim 1, wherein said control circuitry of said second unit includes means for detecting immersion of said second unit in fluid, said fluid immersion detector means generating said triggering signal.

6. The apparatus as claimed in claim 1, wherein said second unit includes a mounting means for attachment to a person and means for generating said triggering signal upon disengagement of said mounting means from said person.

7. The apparatus as claimed in claim 1, wherein said second unit includes a manually operable switch for generating said triggering signal.

8. The apparatus as claimed in claim 1, wherein said second unit includes means for monitoring voltage in said unit and generating said triggering signal when said voltage drops below a predetermined amount.

9. The apparatus as claimed in claim 1, wherein said control circuitry in said first unit includes means for interrupting RF modulation from its associated transmitter, said control circuitry of said second unit includes means for detecting the absence of said RF modulation from said transmitter of said first unit and means for generating said triggering signal.

10. The s as claimed in claim 1, wherein said apparatus comprises a plurality of matched pairs of said first and second transceiver units, each said matched pair operating on an RF frequency differing from each other matched pair.

11. The apparatus as claimed in claim 1, wherein each said transceiver unit includes means for generating a digitally coded signal to identify the transceiver.

12. Ranging apparatus comprising first and second transceiver units, each said transceiver unit containing an RF transmitter, RF receiver and control circuitry, said control circuitry including means of determining the distance between said first and second units independent of the received RF field strength of the transmitter of the other unit, said control circuitry of said first unit including reference frequency generator means for causing its associated transmitter to transmit a modulated RF pulse, the control circuitry of said second unit including phase lock loop means for frequency and phase alignment with said RF signal transmitted by said first unit and received by said RF signal transmitted by said first unit and received by the second unit, upon receipt of said modulated RF pulse by the receiver of said second unit the control circuitry of said second unit causing its associated transmitter to transmit a reply RF pulse modulated in accordance with said received signal and in phase therewith.

said control circuitry of said first unit including means for between said transmitted pulse and said received reply RF pulse to thereby determine the distance between units display means connected to said control circuitry for indicating the determined distance between the units. The apparatus as claimed in claim 1, wherein said control circuitry includes means for pulsing the transmitter and receiver of each unit in time coordination with each other to thereby conserver power, said pulsing means of said first unit including means for generating a reference frequency, said reference frequency driving said transmitter of said first unit, said receiver of said second unit receiving said reference frequency signal and generating an internal reference signal which is used to provide a time aligned periodic pulse for energizing the transmitter and receiver of said second unit, said first and second units thereby being actuated simultaneously.

13. Ranging apparatus comprising first and second transceiver units, each said transceiver unit containing an RF transmitter, RF receiver and control circuitry, said control circuitry including means of determining the distance between said first and second units independent of the received RF field strength of the transmitter of the other unit, said control circuitry of said first unit including reference frequency generator means for causing its associated transmitter to transmit a modulated RF pulse, the control circuitry of said second unit including phase lock loop means for frequency and phase alignment with said RF signal transmitted by said first unit and received by said RF signal transmitted by said first unit and received by the second unit, upon receipt of said modulated RF pulse by the receiver of said second unit the control circuitry of said second unit causing its associated transmitter to transmit a reply RF pulse modulated in accordance with said received signal and in phase therewith, said control circuitry of said first unit including means for between said transmitted pulse and said received reply RF pulse to thereby determine the distance between units display means connected to said control circuitry for indicating the determined distance between the units.

said control circuitry including means for pulsing the transmitter and receiver of each unit in time coordination with each other to thereby conserve power said pulsing means of said first unit including means for generating a reference frequency, said reference frequency driving said transmitter of said first unit, said receiver of said second unit receiving said reference frequency signal and generating an internal reference signal which is used to provide a time aligned periodic pulse for energizing the transmitter and receiver of said second unit, said first and second units thereby being actuated simultaneously, said control circuitry of said second unit begins time alignment between said first and said second units by its associated transmitter transmitting an RF pulse independent of said receiver of said first unit, said receiver of said first unit including means to enable said receiver of first unit to remain in a receiving mode including means for time alignment when said transmitter pulse from said second unit causes said receiver from said first unit to time align when said pulse from said second unit is received by said receiver of said first unit.

14. Ranging apparatus comprising first and second transceiver units, each said transceiver unit containing an RF transmitter, RF receiver and control circuitry, said control circuitry including means of determining the distance between said first and second units independent of the received RF field strength of the transmitter of the other unit, said control circuitry of said first unit including reference frequency generator means for causing its associated transmitter to transmit a modulated RF pulse, the control circuitry of said second unit including phase lock loop means for frequency and phase alignment with said RF signal transmitted by said first unit and received by said RF signal transmitted by said first unit and received by the second unit, upon receipt of said modulated RF pulse by the receiver of said second unit the control circuitry of said second unit causing its associated transmitter to transmit a replay RF pulse modulated in accordance with said received signal and in phase therewith, said control circuitry of said first unit including means for between said transmitted pulse and said received reply RF pulse to thereby determine the distance between units display means connected to said control circuitry for indicating the determined distance between the units said control circuitry including means for pulsing the transmitter and receiver of each unit in time coordination with each other to thereby conserve power said pulsing means of said first unit including means for generating a reference frequency, said reference frequency driving said transmitter of said first unit, said receiver of said second unit receiving said reference frequency signal and generating an internal reference signal which is used to provide a time aligned periodic pulse for energizing the transmitter and receiver of said second unit, said first and second units thereby being actuated simultaneously said control circuitry of said second unit begins time alignment between said first and said second units by its associated transmitter transmitting an RF pulse independent of said receiver of said first unit, said receiver of said first unit including means to enable said receiver of first unit to remain in a receiving mode including means for time alignment when said transmitter pulse from said second unit causes said receiver from said first unit to time align when said pulse from said second unit is received by said receiver of said first unit, said control circuitry including means for triggering an alarm signal when said first and said second units are not time aligned.

* * * * *